June 4, 1968   TETSUO KOBAYASHI ET AL   3,386,311
LOCKING DEVICE FOR HANDBRAKE
Filed March 18, 1966                2 Sheets-Sheet 1

Tetsuo Kobayashi
Teruaki Kasai
INVENTORS

BY
Stevens, Davis, Miller & Mosher
ATTORNEYS

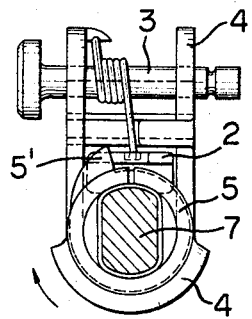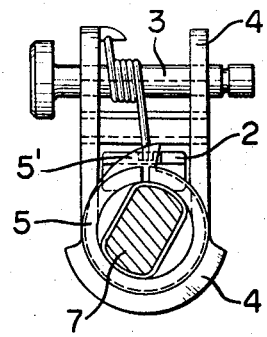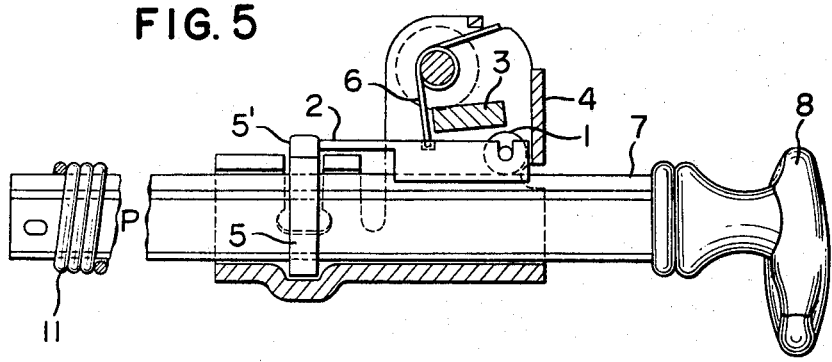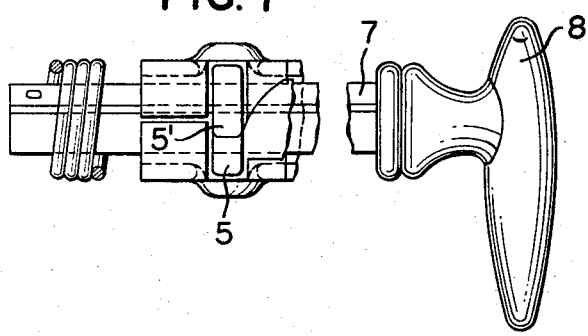

3,386,311
LOCKING DEVICE FOR HANDBRAKE
Tetsuo Kobayashi and Teruaki Kasai, Tokyo, Japan, assignors to Otsukakoki Kabushikigaisha, Yokohamashi, Japan
Filed Mar. 18, 1966, Ser. No. 541,898
Claims priority, application Japan, Sept. 14, 1965, 40/74,917
4 Claims. (Cl. 74—531)

ABSTRACT OF THE DISCLOSURE

A locking device for an emergency or parking brake of an automotive vehicle in which a spring-loaded shaft having a brake handle at one end and a releasing pin mounted thereon is rotated to cause movement of an actuator plate in the axial direction of the shaft. A roller is supported by the actuator plate and is movable into and out of a wedging engagement between the shaft and the stopper plate in response to the rotation of the shaft.

---

The present invention relates to a locking device for a handbrake used in an automobile or the like.

In one of the conventional handbrakes widely used in an automobile or the like, a brake handle is slidably mounted in a cab so that it can be pulled and pushed to set and release the brake. A locking device for such handbrake consists of teeth formed on a shaft of the brake handle and a pawl adapted to engage in one of said teeth to lock the brake handle in the pulled position, that is, the brake setting position. In such locking device, the locking position of the brake handle is determined by the pitch of said teeth, and it is impossible to lock the brake handle in any desired position. Moreover, the locking device of this type makes a noise when the teeth slide over the pawl, which is uncomfortable for the operator. The teeth and the pawl are subjected to wear and damage, which decrease the life of the device and frequently lead to traffic accidents.

In order to obviate such defects, I have invented a locking device in which the brake handle can be locked by the frictional engagement of a roller with the shaft of the brake handle, instead of the meshing engagement of the pawl with the teeth formed on the shaft. In this locking device, the roller is mounted for movement into and out of wedging engagement between the shaft of the brake handle and a stopper plate to lock and unlock the brake handle. In order to move the roller, the shaft of the brake handle is formed with a groove in which is fitted a releasing pin which engages with the forward end of an actuator plate to move said roller. When the brake handle is rotated, the releasing pin is rotated with the handle shaft, thereby pushing the forward end of said actuator plate so as to move the roller out of engagement between the shaft and the stopper plate. With this construction, however, the groove formed in the shaft of the brake handle and the releasing pin have complicated shapes and must be accurately formed, and consequently the manufacturing cost is relatively high.

It is an object of the present invention to provide a locking device for a handbrake in which the brake handle can be locked in any desired position.

It is another object of the present invention to provide a locking device for a handbrake which operates smoothly without making uncomfortable noise and has long life.

It is another object of the present invention to provide a locking device for a handbrake which is simple in construction and low in cost.

Now the invention will be fully described with reference to the accompanying drawings, in which:

FIG. 3 is a cross section of the same;

FIG. 5 is a side view, partly broken, of the locking device of FIG. 2, in its unlocked position;

FIG. 6 is a cross section of the same; and

FIG. 7 is a plan of the same.

Figure 1:
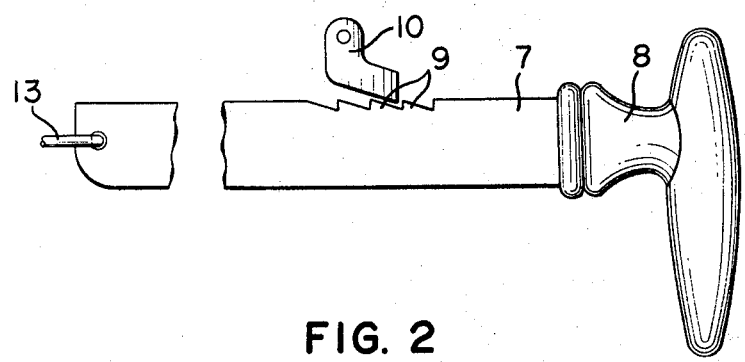
FIG. 1 is a side view of the conventional locking device for the handbrake.
Figure 2:
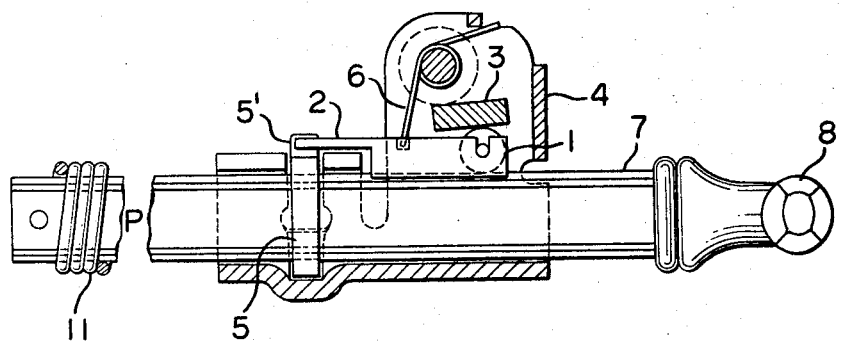
FIG. 2 is a side view, partly broken, showing an embodiment of the present invention in the locked position.
Figure 4:
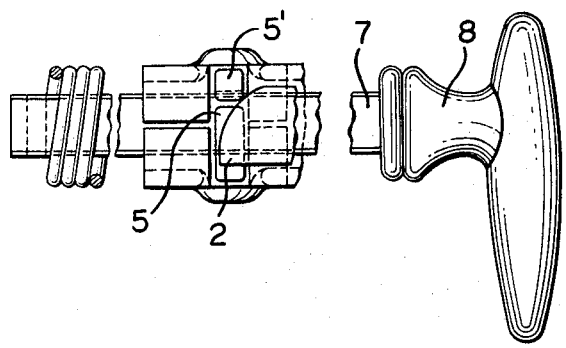
FIG. 4 is a plan of FIG. 2.

Referring to FIG. 1 showing one of the conventional handbrakes, a brake handle 8 having a shaft 7 is connected through a cable 13 to braking means provided in wheels. The locking device for the handbrake consists of teeth 9 formed on the shaft 7 and a pawl 10 adapted to engage in one of the teeth 9 to lock the shaft in the brake setting position.

Referring to FIGS. 2 to 7 which illustrate one embodiment of the present invention, the shaft 7 of the brake handle 8 has a circular cross section which is partly broken, that is, cut in two parts of the circumference in the embodiment shown in the drawings, as best seen in FIGS. 3 and 6. A releasing pin 5 is in the form of a ring which conforms to the shape of the shaft 7. A roller 1 is supported by an actuator plate 2 for movement into and out of wedging engagement between the shaft 7 of the brake handle 8 and a stopper plate 3 to lock and unlock the brake handle. The actuator plate 2 is normally pushed forward by a spring 6 and the forward end of the plate 2 is in the form of a cam which contacts with a projection 5' of the releasing pin 5. A cover 4 encloses the parts of the locking device.

When the brake handle 8 is rotated, the shaft 7 is also rotated in the direction shown by an arrow as shown in FIG. 3 and, consequently, the releasing pin 5 is rotated therewith. The projection 5' of the releasing pin 5 pushes the actuator plate 2 against the action of the spring 6, from the position shown in FIGS. 3 and 4 to that shown in FIGS. 6 and 7. The actuator plate 2 moves backward so as to move the roller 1 supported at the other end of the plate 2 out of wedging engagement between the stopper plate 3 and the shaft 7, and thus the shaft 7 is released from the frictional engagement with the roller 1, so that the brake handle can be easily operated. If the manual force on the brake handle is removed, the shaft 7 is rotated in the reverse direction by the action of a spring 11 attached to the end of the shaft. The force exerted on the actuator plate 2 by the projection 5' disappears, so that the plate 2 is moved forward by the spring 6 from the position shown in FIG. 5 to that shown in FIG. 2. Thus the roller 1 is moved into wedging engagement between the stopper plate 3 and the shaft 7, thus locking the shaft 7 by the frictional engagement.

It will be understood that the embodiment of the invention herein described and illustrated is merely a convenient and useful form of the invention which is capable of many other modifications without departing from the spirit and the scope of the invention.

What is claimed is:

1. A locking device for a handbrake comprising a shaft having a handle at one end, a cover extending over a portion of said shaft, a releasing member protruding from said shaft, an actuator plate mounted in said cover for slidable movement in the axial direction of said shaft, resilient means in said cover and urging said actuator plate in a direction towards said releasing member, a wedging member supported by said actuator plate, and a stopper for said wedging member fixed with respect to said cover, one end of said actuator plate being cammed and adapted to engage said releasing member to transmit rotary movement of said handle to axial movement of said actuator plate and move said wedging member in and out of engagement with said stopper.

2. The device of claim 1, wherein said wedging member is in the form of a roller and wherein said stopper is in the form of a plate extending at an angle with respect to said shaft.

3. The device of claim 1, further comprising additional resilient means engaging said shaft to effect a return rotary motion thereof.

4. The device of claim 1, wherein said cover is continuous throughout its length.

References Cited

UNITED STATES PATENTS 2,664,014   12/1953   Feemster et al. _____ 74—531 X

MILTON KAUFMAN, *Primary Examiner.*

FRED C. MATTERN, *Examiner.*